United States Patent
Bhatia et al.

(10) Patent No.: US 7,422,671 B2
(45) Date of Patent: Sep. 9, 2008

(54) NON-LINE-OF-SIGHT PROCESS FOR COATING COMPLEXED SHAPED STRUCTURES

(75) Inventors: Tania Bhatia, Middletown, CT (US); Neil Baldwin, Mission Viejo, CA (US); Robert A. Barth, South Windsor, CT (US); Xia Tang, W. Hartford, CT (US); John E. Holowczak, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 356 days.

(21) Appl. No.: 10/914,925

(22) Filed: Aug. 9, 2004

(65) Prior Publication Data

US 2006/0029733 A1    Feb. 9, 2006

(51) Int. Cl.
C25D 13/02    (2006.01)
(52) U.S. Cl. .................. 204/487; 204/491; 427/404; 427/419.2
(58) Field of Classification Search .............. 204/484, 204/490, 491, 487; 427/404, 419.2
See application file for complete search history.

(56) References Cited

U.S. PATENT DOCUMENTS 4,971,839 A * 11/1990 Rohr et al. ............... 427/372.2
5,415,748 A     5/1995 Emiliani et al.
6,254,935 B1    7/2001 Eaton et al.
6,258,237 B1    7/2001 Gal-Or et al.
6,358,567 B2 *  3/2002 Pham et al. ................. 427/115
2005/0074625 A1 * 4/2005 Meschter et al. ............ 428/620

FOREIGN PATENT DOCUMENTS

| EP | 1 044 943 | 10/2000 |
| JP | 58081995 | 5/1983 |
| JP | 03047977 | 2/1991 |
| JP | 03153502 | 7/1991 |
| JP | 09227254 | 9/1997 |
| JP | 2001089134 | 4/2001 |

OTHER PUBLICATIONS

"Novel Fabrication Technique for the Production of Ceramic/Ceramic and Metal/Ceramic Composite Coatings", By Wang et al., published Mar. 17, 2003, vol. 42, No. 7, pp. 653-659.
"Oxidation Protection of C/C-SiC Composites by an Electrophoretically Deposited Mullite Precursor", By Damjanovic et al., published Jul. 20, 2004, vol. 25, No. 5, pp. 577-587.
"SrBi2Ta2O9 Ferroelectric Thick Films Prepared by Electrophoretic Deposition Using Aqueous Suspension", By Zanetti et al., published Jul. 2004, vol. 24, No. 8, pp. 2445-2451.
Database WPI Week 198835, Derwent Publications Ltd., London, GB; An 1988-245082, XP002414945, Jul. 20, 1988.

* cited by examiner

Primary Examiner—Kishor Mayekar
(74) Attorney, Agent, or Firm—Bachman & Lapointe, P.C.

(57) ABSTRACT

Non-line-of-sight process for coating complexed shaped structures of Si-based substrates with protective barrier layers.

29 Claims, 1 Drawing Sheet

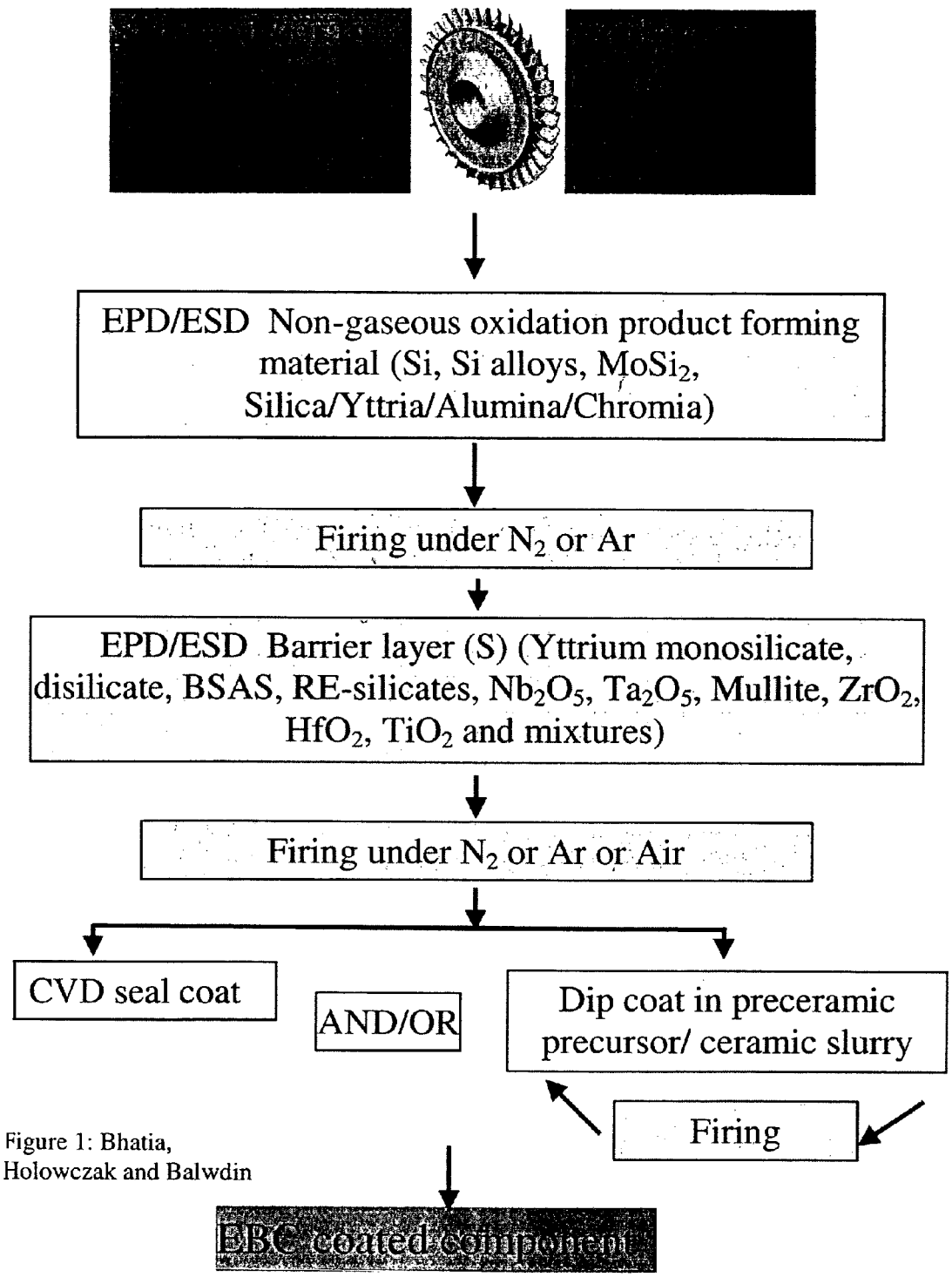
Figure 1: Bhatia, Holowczak and Balwdin

NON-LINE-OF-SIGHT PROCESS FOR COATING COMPLEXED SHAPED STRUCTURES

U.S. GOVERNMENT RIGHTS

The invention was made with U.S. Government support under contract N00014-01-C-0032 awarded by the U.S. Navy. The U.S. Government may have certain rights in the invention.

BACKGROUND OF THE INVENTION

The present invention relates to a process for the deposition of protective coatings on complex shaped Si-based substrates which are used in articles subjected to high temperature, aqueous environments.

Ceramic materials containing silicon have been proposed for structures used in high temperature applications, for example, gas turbine engines, heat exchangers, internal combustion engines, and the like. A particularly useful application for these materials is in gas turbine engines, which operate at high temperatures in aqueous environments. It has been found that such silicon containing substrates can recede and lose mass as a result of a formation volatile Si species, particularly $Si(OH)_x$ and SiO when exposed to high temperature, aqueous environments. For example, silicon carbide, when exposed to a lean fuel environment of approximately 1 ATM pressure of water vapor at 1200° C., will exhibit weight loss and recession at a rate of approximately 6 mils per 1000 hrs. It is believed that the process involves oxidation of the silicon carbide to form silica on the surface of the silicon carbide, followed by reaction of the silica with steam to form volatile species of silicon such as $Si(OH)_x$.

Suitable coatings for articles containing silicon based substrates which are employed in the environments claimed above are well known in the art. See for example U.S. Pat. Nos. 5,305,726; 5,869,146; 6,284,325; 6,296,941; 6,352,790; and 6,387,456. The prior art described in the foregoing patent documents fail to teach processes for applying protective coatings to complex shaped parts such as, for example, integral vane rings and integrally bladed rotors. Typically, such complex shaped parts have been coated by a chemical vapor deposition (CVD) process; however, such CVD processes are limited in that they are only applicable to simple oxide coatings, are limited in terms of thickness and uniformity of the coating layer, and are expensive.

Naturally, it would be highly desirable to provide improved processes for the deposition of protective coatings on complex shaped Si-based structures.

Accordingly, it is a principle object of the present invention to provide a non-line-of-sight process as aforesaid which is efficient and inexpensive when compared to prior art processes.

It is a further object of the present invention to provide processes as aforesaid which include electrophoretic deposition (EPD) and electrostatic deposition (ESD) of protective coatings.

It is a still further object of the present invention to provide an EPD process which is efficient for the deposition of protective coatings on complex shaped Si-based structures.

SUMMARY OF THE INVENTION

The present invention relates to processes for the deposition of protective coatings on complex shaped substrates, and particularly Si-based substrates, which are used in articles and structures subjected to high temperature, aqueous environments. Other substrates are contemplated in addition to Si-based substrates and include metal, alloy metal substrates, ceramic substrates and the like. By complex shaped is meant components which have geometric shapes which make physical deposition techniques for depositing coatings difficult, i.e., difficult to coat by line-of-sight processes. Such complex shaped parts include, for example, integral vane rings and integrally bladed rotors.

The processes of the present invention include non-line-of-sight processes and, particularly electrophoretic deposition (EPD) and electrostatic deposition (ESD) processes. Both the EPD and ESD processes can be used to deposit green barrier layers on silicon-based substrates of complex shaped articles. The green deposited layers can then be densified by high temperature firing. Chemical vapor deposition (CVD) may be used in conjunction with either the EPD process or the ESD process in order to seal the coatings produced thereby.

When employing an electrophoretic deposition process in accordance with the present invention, it is necessary that the substrate be electrically conducting and, accordingly, the substrate might need to be rendered conducting if formed of a non-conducting material. The electrostatic deposition process does not require an electrically conductive layer on the substrate. The preferred electrophertic deposition process of the present invention comprises suspending the material to be applied as the barrier layer in a suspension medium, submerging the silicon-based substrate with an electrically conductive layer as an electrode in the suspension medium, and applying a voltage while the material is in suspension.

Further objects and advantages of the present invention will appear hereinbelow from the following detailed description.

BRIEF DESCRIPTION OF THE DRAWINGS

The FIGURE is a flow diagram of a preferred process in accordance with the present invention.

DETAILED DESCRIPTION

The present invention relates to a process for the deposition of protective coatings on complex shaped Si-based substrates which are used in structures subjected to high temperature, aqueous environments. By complex shaped parts that require protective coatings are meant components typically airfoils or narrow tubular gas turbine components, that are difficult (if not impossible) to coat efficiently by line-of-sight processes. The geometry of the component makes it difficult to access it by either a plasma gun or by gaseous precursor species in conventional physical deposition techniques. An example of a complex shaped part is an integral vane assembly which consists of a set of 8-20 vanes with integral outer and inner platforms. It could also apply to airfoil doublets. Internal turbine blade assemblies that require coatings are also considered complex shaped components. Typically, when such components are coated by line-of-sight techniques such as thermal spray and physical vapor deposition, the quality and therefore effectiveness of the coating is compromised because of the lack of access of the coating species to the substrate.

The process of the present invention comprises providing a complex shaped substrate, particularly a Si-based substrate, applying at least one barrier layer by at least one of electrophoretic deposition (EPD) and electrostatic deposition (ESD); and densifying the barrier layer. In one embodiment of the present invention, a bond coat is applied to the Si-based substrate by either EPD or ESD prior to the deposition of the barrier layer(s). After applying the bond coat to the silicon-based substrate, the bond coated substrate is fired under controlled conditions to densify the bond coat while prohibiting oxidation of the Si-based substrate. In accordance with a preferred embodiment of the present invention, the firing of the bond coated substrate is carried out at a temperature of between 1000° C. to 1500° C. and the thickness of the bond coat is at least 0.5 microns. The firing of the substrate with green coat is preferably carried out in a non-oxidizing environment such as nitrogen and/or argon; however, firing in air is acceptable.

Once the bond coat is applied to the Si-based substrate, at least one barrier layer may be applied by either EPD and/or ESD. The barrier layer applied on the bond coat is thereafter densified at a temperature below the melting point of the substrate or, if employed, bond coat. In a further embodiment, after densification of the barrier layer(s), a top coat may be applied to the barrier layer to form a substantially gas tight-steam resistant top coat. In accordance with the present invention, the top coat may be applied by chemical vapor deposition (CVD). The top coat may be applied by dipping and firing the coated substrate in a preceramic precursors such as, for example, nitrates and/or acetates of aluminum, tantalum, niobium, hafnium, zirconium, yttrium and/or titanium or combinations thereof. Alternatively, the substrate may also be dipped directly into a slurry containing the desired top layer material. The figure illustrates a preferred embodiment of the process of the present invention as set forth above.

The process described above is particularly useful for silicon-based substrates consisting of silicon carbide or silicon nitride. As noted above, the barrier layer must be densified prior to application of a top coat. The density of the barrier layer post firing is high and the porosity is less than 30% by volume. The sintering characteristics of the green body determine the firing schedule. By firing schedule is meant the firing temperatures, the rate of heating and cooling, and the duration of firing at each temperature. In addition, in the preferred process of the present invention, the bond coat applied to the substrate should be dense with volume percent porosity less than 10%. The preferred porosity level for an environmental barrier layer is also less than 10 volume %. The bond coat of the present invention comprises a non-gaseous oxidation product forming layer. The bond coat material is selected from the group consisting of Si metal, Si/MoSi$_2$/Si-based alloys, chromium, tantalum, niobium, silicon, molybdenum, hafnium, titanium, zirconium, platinum, palladium, gold, or mixtures thereof. Silicon metal is a particularly useful bond coat material.

The one or more barrier layers applied may be any of the barrier layers described in the above cited patents referred to in the Background of the Invention. Particularly useful barrier layers in the process of the present invention are selected from the group consisting of yttrium monosilicate, yttrium disilicate, rare earth silicates, alkaline-earth aluminosilicates such as barium-strontium-aluminosilicate, niobium oxide, tantalum oxide, zirconium oxide, hafnium oxide, yttrium oxide, titanium oxide, mullite and mixtures thereof. Particularly useful top coats whether applied by CVD or from slurry are selected from the group consisting of yttrium oxide, yttrium monosilicate, yttrium dislocate, rare earth silicates, alkaline earth aluminosilicates, barium-strontium-aluminosilicates, hafnium oxide, titanium oxide, niobium oxide, tantalum oxide, zirconium oxide, mullite, and mixtures thereof. It is preferred that the top coat is substantially free of porosity (porosity less than 10% by volume).

When employing an EPD process for deposition of the barrier layer(s), the efficiency of the coating process is greatly enhanced if using an electrically conductive surface layer prior to applying the barrier layer(s). In accordance with the preferred EPD process of the present invention, the electrically conductive layer which is selected from the group consisting of chromium, tantalum, niobium, silicon, molybdenum, hafnium, titanium, zirconium, platinum, palladium, gold, or mixtures thereof may be applied by chemical vapor deposition. In one embodiment of the EPD process of the present invention, protective coatings of the thicknesses between 10-150 microns may be applied on the silicon-based substrate. The material may be of any described above. Preferred materials are selected (but not restricted to) from the group consisting of yttrium monosilicate, yttrium disilicate, rare earth silicates, yttrium oxide, rare earth aluminosilicates, niobium oxide, tantalum oxide, zirconium oxide, hafnium oxide, titanium oxide, mullite and mixtures thereof. A particularly suitable protective coating is barium-strontium-aluminosilicate as well as other alkaline-earth alumino-silicates.

In accordance with the preferred EPD process of the present invention the particle size of the starting powders to be applied as the barrier layer is in the range 0.2-30 microns preferably sub-micron. The material might be classified for use in the EPD process. The classification step comprises suspending the milled powdered material in a suspension medium such as, for example, propanol, ethanol, water, methanol, butanol, glycol and mixtures thereof. The powder is suspended in the suspension medium by vigorously agitation the powder into the medium. Those particles which do not settle out within 90 seconds after the end of stirring, preferably 120 seconds, are suitable for the subsequent EPD process as described below. The preferred particle sized powder is mixed into the suspension solution, most preferably propanol or water, the concentration of between 0.1-10 gram powder per 1 milliliter suspension medium. Optionally, binder may be added to the suspension solution to increase the adherence of the barrier coating powder to the substrate. Particularly useful binders are cellulose acetate butyrate, polyvinyl alcohol, colloidal silica, polyvinyl buterol, aluminum isopropoxide, zirconium isopopoxide and sodium silicate. Dispersion of the slurries may be achieved electrostatic dispersion by control of pH or by the addition of electrosteric dispersants (for example those based on poly acrylic acid (PAA)). The suspension solution is then stirred so as to provide a homogeneous suspension of the barrier layer material without the binder. The silicon based substrate to be coated, with the electrically conductive surface layer, is submerged into the suspension medium as the cathode. A counter electrode is likewise submerged into the suspension medium and a voltage is applied while the particle sized powder is in suspension in the suspension medium so as to form a green layer of the material on the silicon-substrate. In accordance with the present invention, a suitable field strength is between 1 to 50 volts/cm. Agitation, such as magnetic stirring or ultrasonic vibration or by other methods known in the art, of the suspension medium may be carried out during the application of the electric fields in order to minimize any particle settling. The green coated silicon-substrate is thereafter dried and the green coating is subsequently sintered.

It has been found that the processes of the present invention allow for the efficient coating of complex shaped structures. The coatings produced are sufficiently thick and uniform so as to have a predictable service life in high temperature aqueous environments.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the deposition of protective coatings on complex shaped components, comprising the steps of:
    providing a complex shaped Si-based substrate;
    applying a bond coat on the Si-based substrate by at least one of electrophoretic deposition (EPD) and electrostatic deposition (ESD);
    firing the bond coated substrate under controlled conditions to densify the bond coat while prohibiting oxidation of the Si-based substrate;
    applying at least one barrier layer by at least one of electrophoretic deposition and electrostatic deposition;
    densifying the barrier layer at a temperature below the melting point of the substrate; and
    applying a top coat on the densified barrier layer to form a substantially gas tight, steam resistant top coat.

2. A process according to claim 1, applying the top coat by at least one of (a) chemical vapor deposition, and (b) dipping in a slurry of ceramic material followed by firing.

3. A process according to claim 2, wherein the top coating is selected from the group consisting of yttrium oxide, yttrium monosilicate, yttrium disilicate, rare earth silicates, alkaline earth aluminosilicates, barium-strontium-aluminosilicates, hafnium oxide, titanium oxide, niobium oxide, tantalum oxide, zirconium oxide, mullite, and mixtures thereof.

4. A process according to claim 3, wherein the density of the top coat is at least 90% of theoretical.

5. A process according to claim 1, wherein the Si-based substrate is selected from the group consisting of SiC and $Si_3N_4$.

6. A process according to claim 1, wherein firing the bond coated substrate is carried out in a non-oxidizing environment.

7. A process according to claim 6, wherein firing the bond coated substrate is carried out at a temperature of between 1000 to 1500° C.

8. A process according to claim 6, wherein the thickness of the bond coat is between 0.5 to 50 microns.

9. A process according to claim 1, wherein densifying the barrier layer is carried out in a non-oxidizing environment.

10. A process according to claim 1, wherein the porosity of the barrier layer is less than 30% by volume.

11. A process according to claim 1, wherein the bond coat has a porosity less than 10% by volume.

12. A process according to claim 1, wherein the bond coat comprises at least one of: a Si metal, a Si metal containing material, a Si-based alloy, a $MoSi_2$-based alloy, chromium, tantalum, niobium, silicon, molybdenum, hafnium, titanium, zirconium, platinum, palladium, gold, and mixtures thereof.

13. A process according to claim 1, wherein the bond coat comprises a non-gaseous oxidation product forming layer.

14. A process according to claim 1, wherein the at least one barrier layer is selected from the group consisting of yttrium monosilicate, yttrium disilicate, rare earth silicates, aluminosilicates, alkaline-earth-aluminosilicates, barium-strontium-aluminosilicates, niobium oxide, tantalum oxide, zirconium oxide, hafnium oxide, titanium oxide, mullite and mixtures thereof.

15. A process according to claim 1, further including the step of coating the Si-based substrate with an electrically conductive layer prior to applying the at least one barrier layer.

16. A process according to claim 15, wherein the electrically conductive layer is applied by chemical vapor deposition (CVD).

17. A process according to claim 16, wherein the electrically conductive layer is selected from the group consisting of silicon, yttrium, lanthanum, chromium, tantalum, niobium, silicon, molybdenum, hafnium, titanium, zirconium, platinum, gold and mixtures thereof.

18. A process according to claim 15, wherein the barrier layer is applied by electrophoretic deposition (EPD).

19. A process according to claim 18, further comprising the steps of:
    providing a powder of the material to be applied as the barrier layer;
    selecting a preferred particle size of the powdered material;
    suspending the preferred particle sized powder in a suspension medium;
    submerging the Si-based substrate with electrically conductive layer as an electrode and counter electrode in the suspension medium containing the preferred particle sized powder; and
    applying a voltage while the particle sized powder is in suspension in the suspension medium to form a green layer of the material on the substrate.

20. A process according to claim 19, further including drying and sintering the green layer to form the barrier layer.

21. A process according to claim 19, wherein selecting the preferred particle size of the powdered material comprises the steps of:
    suspending the material in the suspension medium by agitation to provide a homogeneous distribution of material in suspension;
    cease agitation and allow suspension to stand for a preselected time (T); and
    selecting the particles which are in suspension at time (T).

22. A process according to claim 21, wherein T is at least 90 seconds.

23. A process according to claim 21, wherein T is at least 120 seconds.

24. A process according to claim 19, wherein the suspension medium is selected from the group consisting of propanol, ethanol, water, methanol, butanol, glycol and mixtures thereof.

25. A process according to claim 19, wherein the concentration of the material of the barrier layer in suspension is between 1 to 10 g/ml of suspension medium.

26. A process according to claim 19, further including suspending a binder material in the suspension medium with the material of the barrier layer.

27. A process according to claim 26, wherein the binder material is at least one of cellulose acetate butyrate, polyvinyl alcohol, colloidal silica, polyvinyl buterol, aluminum isopropoxide, zirconium isopropoxide and sodium silicate.

28. A process according to claim 19, wherein the material to be applied as the barrier layer is selected from the group consisting of yttrium oxide, yttrium monosilicate, yttrium disilicate, rare earth silicates, barium-strontium-aluminosilicates, niobium oxide, tantalum oxide, zirconium oxide, hafnium oxide, titanium oxide, mullite aluminosilicates and mixtures thereof.

29. A process according to claim 19, wherein the material comprises barium-strontium-aluminosilicate (BSAS).

* * * * *